(No Model.)

J. PHELPS.
CAR COUPLING.

No. 423,340.  Patented Mar. 11, 1890.

WITNESSES

William H. Parry

E. J. Emanuel

INVENTOR

Joseph Phelps, by Sylvenus Walker

Attorney

UNITED STATES PATENT OFFICE.

JOSEPH PHELPS, OF NEWTON, MASSACHUSETTS.

CAR-COUPLING.

SPECIFICATION forming part of Letters Patent No. 423,340, dated March 11, 1890.

Application filed June 20, 1889. Serial No. 314,993. (No model.)

*To all whom it may concern:*

Be it known that I, JOSEPH PHELPS, of Newton, in the county of Middlesex and State of Massachusetts, have invented an Improvement in Car-Couplings, of which the following is a specification.

The objects of my invention are to provide a cheap, simple, convenient, and durable automatic or self-acting car-coupling adapted to couple with one of its kind or the common link and pin now in general use for coupling freight or passenger cars together; and it consists in the novel construction, combination, and arrangement of a pivoted link and draw-hook secured rigidly to the horizontal crank-shaft passing through the end portion of the draw-bar or mouth portion thereof, as hereinafter more fully described, and specifically set forth in the claim.

Figure 1:
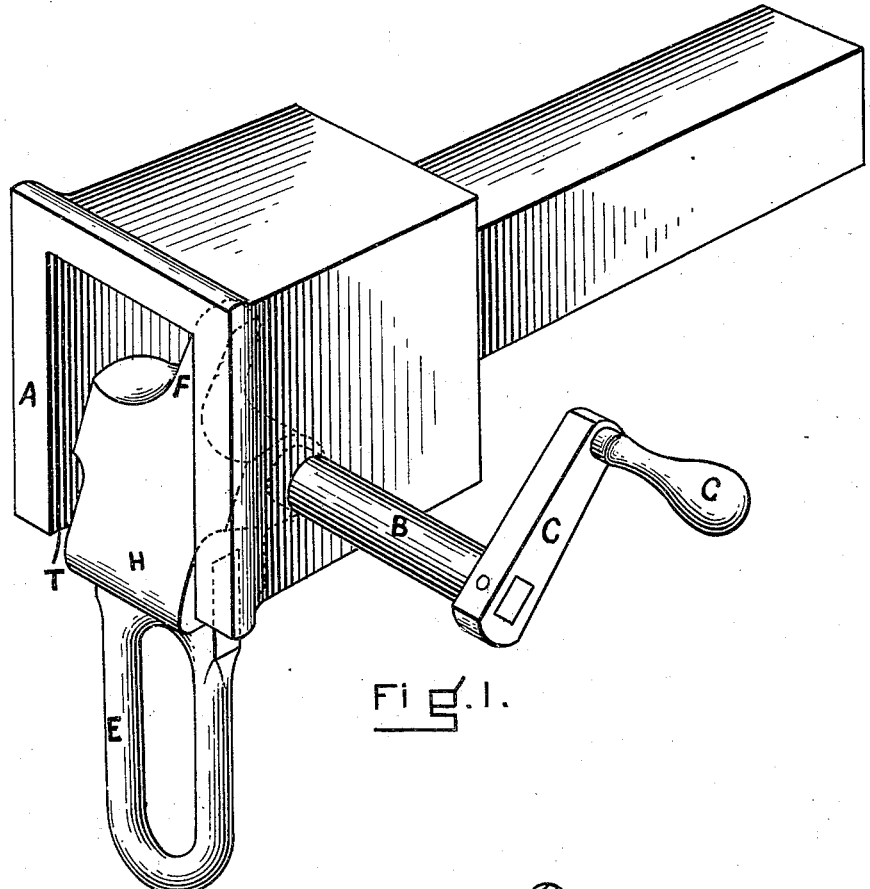
Figure 2:
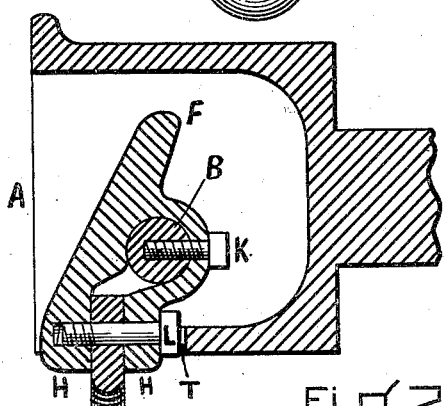
Figure 3:
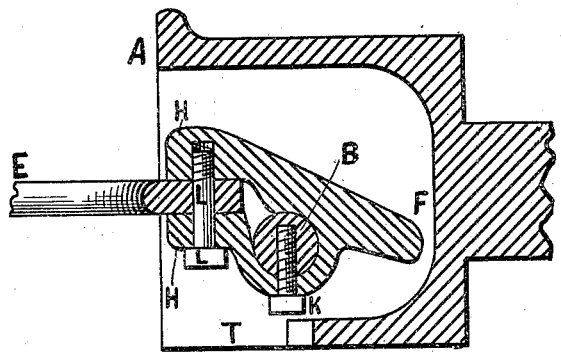

Figure 1 represents a perspective view of a car-coupling constructed according to my invention, showing the mouth end of a draw-bar with the coupling-link turned down into a vertical position. Fig. 2 represents a vertical longitudinal section of the same. Fig. 3 represents a similar view of the same with the link elevated to a horizontal position ready to be coupled to the opposite draw-bar.

A represents the front end or mouth portion of a draw-bar provided with a horizontal rock-shaft B, one end of which projects outward from the side of the draw-bar a suitable distance and has a hand-crank C secured thereto, as shown, and by means of which the pivoted link E is raised or elevated to the desired position to enable the same to pass upward over the inclined front face of the projecting draw-hook F and couple therewith by falling downward over the same. The said coupling-link E is pivoted loosely to or within an opening or between the opposite jaws H of the draw-hook F by a bolt L, and the said portion H, having the said draw-hook F, is firmly secured to the said rock-shaft B by a bolt K, or in any other desired manner.

It will be seen that the lower portion of the mouth of the draw-bar is so constructed or formed as to permit the said link E to drop downward and rest in position therein when not in use, and allow another draw-bar mouth to contact or strike the opposite draw-bar, so as to form a stop or "buffer," without striking against the pendent link when in its normal position, as shown in Figs. 1 and 2, resting in the recess T.

It will be evident that the link may be raised or elevated into position to be coupled with a hook by a brakeman on the top of a car by means of a suitable rod connected at its lower end to said crank and its opposite end extending upward above the top of the car, as heretofore employed for the purpose.

Having thus described my invention, what I claim, and desire to secure by Letters Patent, is—

In a car-coupling, the combination, with the draw-bar A, having a recess in the lower side of the mouth thereof, of the rock-shaft B, having the crank C, the draw-hook F, provided with jaws H H, firmly secured to said rock-shaft, and the link E, loosely pivoted between said jaws by means of pivot L, substantially as described.

JOSEPH PHELPS.

Witnesses:
SYLVENUS WALKER,
WILLIAM H. PARRY.